Dec. 20, 1966  W. ZAÚGG  3,292,981
CAGE FOR ANTIFRICTION BEARINGS
Filed March 20, 1964  2 Sheets-Sheet 1

INVENTOR:
Werner Zaügg by Michael J. Striker
Attorney

Dec. 20, 1966  W. ZAUGG  3,292,981
CAGE FOR ANTIFRICTION BEARINGS
Filed March 20, 1964  2 Sheets-Sheet 2
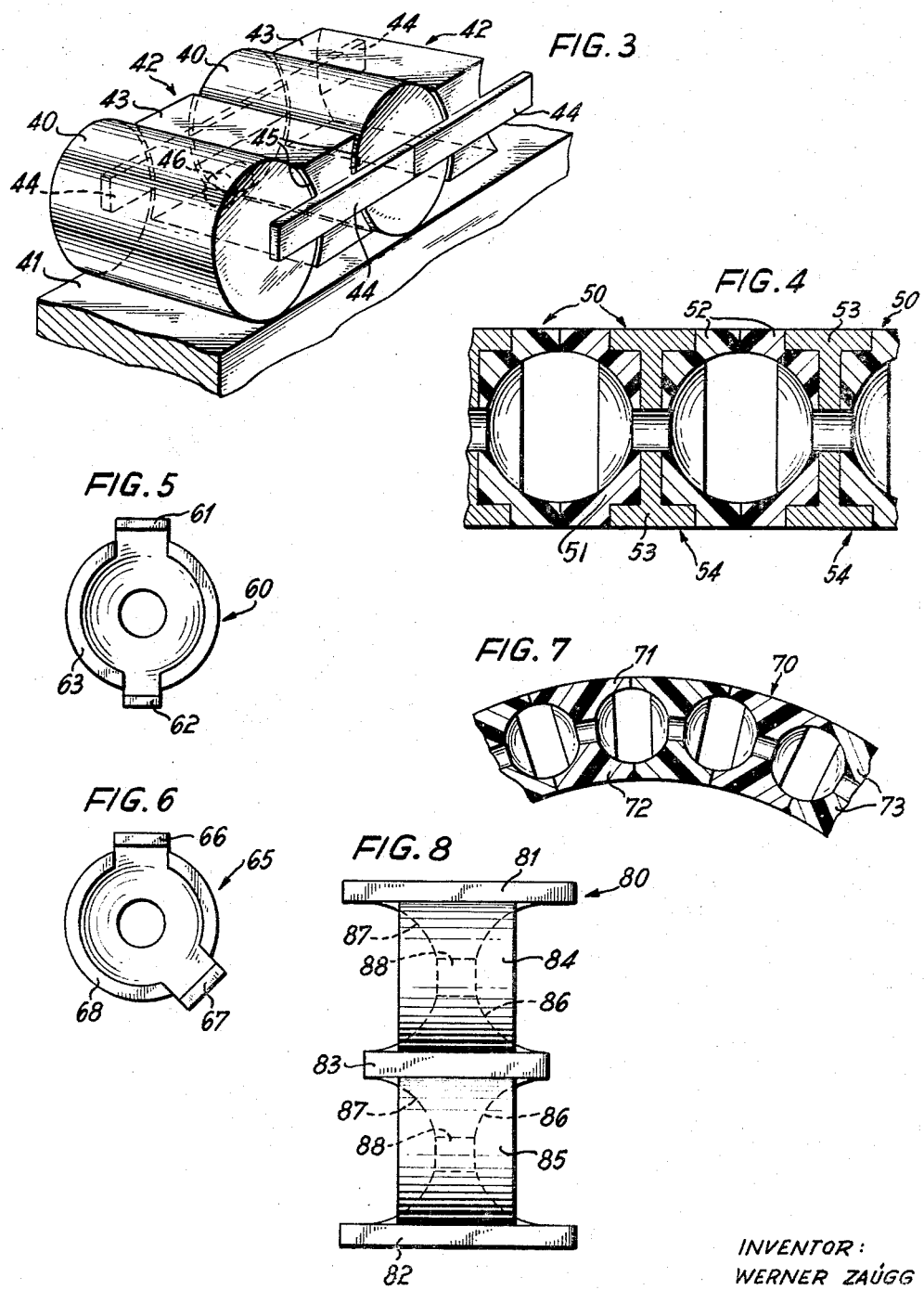
INVENTOR:
WERNER ZAUGG
BY
Michael J. Striker
his ATTORNEY United States Patent Office 3,292,981
Patented Dec. 20, 1966

3,292,981
CAGE FOR ANTIFRICTION BEARINGS
Werner Zaügg, Durrenast-Thun, Switzerland, assignor to Eisenwerk Rothe Erde G.m.b.H., Dortmund, Germany
Filed Mar. 20, 1964, Ser. No. 353,412
Claims priority, application Switzerland, Mar. 28, 1963, 3,998/63
19 Claims. (Cl. 308—201)

The present invention relates to antifriction bearings in general, and more particularly to an improved cage for the rolling elements of antifriction bearings. Still more particularly, the invention relates to a composite cage for use in axial or radial single-row or multiple-row antifriction bearings with spherical, cylindrical, conical, barrel-shaped or otherwise configurated rolling elements.

It is already known to separate the adjoining rolling elements of anti-friction bearings by assembling the rolling elements in one-piece annular cages or by providing a series of inserts which maintain the rolling elements at a requisite distance from each other. A serious drawback of many such bearings is that the inserts are free to turn and are subjected to excessive compressive stresses, particularly in heavy-duty bearings. Such inserts are likely to brake or block the rolling elements so that the bearing will jam with resultant overheating, excessive wear and other undesirable consequences.

Accordingly, it is an important object of my invention to provide a very simple, inexpensive but highly satisfactory composite cage for the rolling elements of antifriction bearings which is constructed and assembled in such a way that it prevents blocking of rolling elements, that its parts cannot undergo excessive deformation such as could result in jamming of the bearing, and that it may be used in all or nearly all types of anti-friction bearings regardless of the size, number and/or configuration of the rolling elements.

Another object of the invention is to provide a composite cage of the just outlined characteristics which is constructed in such a way that its component parts may be readily replaced in the event of excessive wear or accidental damage thereto so that the remaining parts may be reassembled with one or more spare parts for additional use in radial or axial antifriction bearings.

A further object of the invention is to provide an improved retainer which may be utilized in a cage of the above outlined characteristics.

Still another object of the instant invention is to provide a composite cage for the rolling elements of anti-friction bearings which is particularly suited for use in large, heavy-duty bearings and which may be produced in conventional machines and in accordance with known processes at reasonable cost and with sufficient precision to avoid expensive aftertreatment of its parts.

An additional object of the invention is to provide a cage which may be utilized in single-row or multiple-row antifriction bearings with spherical, cylindrical, conical, barrel-shaped or otherwise configurated rolling elements.

A concomitant object of the invention is to provide a cage of the above outlined characteristics which is constructed and assembled in such a way that all of its component parts are subjected to equal or nearly equal stresses so that the wear on the cage is uniform and that the rolling elements are free to roll regardless of any fluctuations in the magnitude of stresses to which the bearings may be subjected in actual use.

An additional object of the invention is to provide a composite cage which simultaneously serves as a distributor or as a source of lubricant.

A further object of the invention is to provide a composite cage which may be produced in all sizes and shapes so that it may be used with many different types of rolling elements and races for axial and/or radial anti-friction bearings.

Still another object of the invention is to provide an anti-friction bearing which embodies a cage of the above outlined characteristics.

With the above objects in view, one feature of the invention resides in the provision of an anti-friction bearing which comprises a pair of annular races defining between themselves a concentric annular channel and an annular recess which is concentric and in communication with the channel, a plurality of spherical, cylindrical, barrel-shaped, conical or otherwise configurated rolling elements which are received in the channel between the races, and a composite cage for the rolling elements. In accordance with my invention, the cage comprises a plurality of annularly disposed retainers of synthetic plastic and/or metallic material each of which includes a partition extending across the channel intermediate a pair of adjoining rolling elements and a guide which is rigid and preferably integral with the respective partition and extends into the recess between the races. Preferably but not necessarily, the guides of adjoining retainers are in actual abutment with each other so as to form a circumferentially complete annulus in the recess, and each partition is preferably provided with a pair of cavities arranged to receive portions of adjoining rolling elements.

If desired, the races may define two or more recesses and each retainer is then provided with an equal number of guides each of which extends into a different recess so that such guides in their entirety form two or more circumferentially complete annuli. The median portion of each partition may be provided with one or more through holes which communicate with both cavities of the respective partition and which may serve as a reservoir for oil or another suitable lubricant.

The novel features which are considered as characteristic of the invention are set forth in particular in the appended claims. The improved cage itself, however, both as to its construction and the mode of assembling the same, together with additional features and advantages thereof, will be best understood upon perusal of the following detailed description of certain specific embodiments with reference to the accompanying drawings, in which:

FIG. 3 is a fragmentary perspective view of an anti-friction bearing with cylindrical rolling elements which are received in a modified cage;

FIG. 4 is an axial section through a portion of a third cage with plastic retainers which are reinforced by metallic inserts;

FIG. 5 is an end elevational view of a retainer which is provided with a pair of differently dimensioned guides;

FIG. 6 is an end elevational view of an asymmetric retainer wherein the angular distance between the guides is less than 180 degrees;

FIG. 7 is an axial section through a series of retainers in a single-row radial anti-friction bearing wherein each retainer comprises a larger outer guide and a smaller inner guide; and FIG. 8 is a side elevational view of a two-stage retainer for use in a double-row anti-friction bearing.

Figure 1:
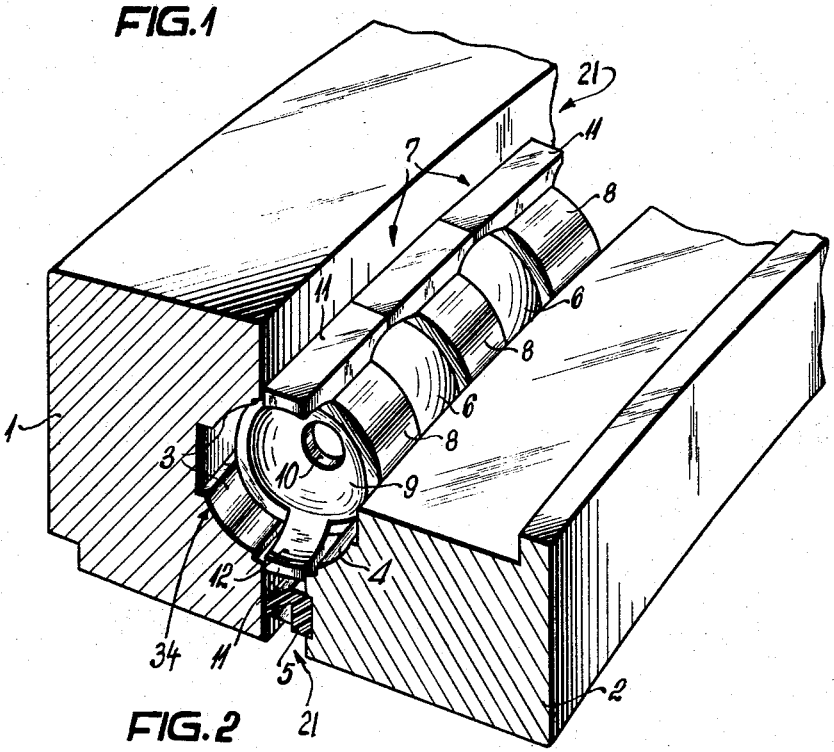
FIG. 1 is a fragmentary perspective view of an anti-friction bearing with spherical rolling elements which are received in a composite cage embodying one form of my invention.

The anti-friction bearing of FIG. 1 comprises a pair of annular races including an outer race 1 and an inner race having two sections 2 one of which is actually shown in the drawings. The bearing is rather large and may be used with great advantage in construction and earth moving machinery. In such machines, the inner race is normally stationary and the outer race 1 rotates with a revolving part of the machine, for example, with the boom of a crane or the like. The inner race may but need not receive a shaft or a similar support.

The outer race 1 is provided with arcuate surfaces 3, and each section 2 of the inner race is provided with similar arcuate surfaces 4. These surfaces define between themselves an annular channel 34 which is concentric with the races and which serves to accommodate a series of equidistant spherical rolling elements 6. The two races further define between themselves two annular recesses 21 which are concentric to and which communicate with the channel 34. Each of these recesses 21 receives at its outer end an annular sealing ring 5 which prevents entry of dirt or moisture and which prevents uncontrolled escape of lubricant from the channel 34. The diameters of the recesses 21 are the same.

Figure 2:
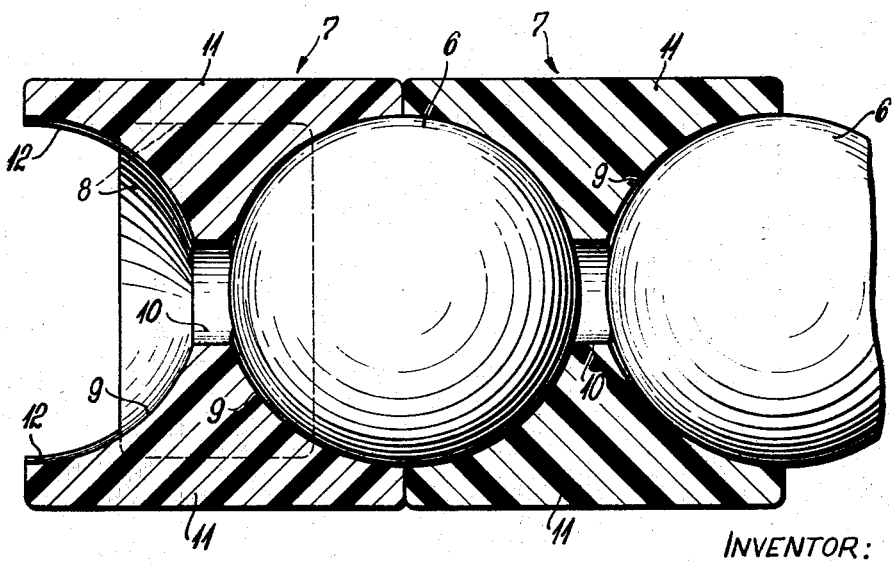
FIG. 2 is a greatly enlarged axial section through a pair of retainers which constitute two elements of the cage shown in FIG. 1.

In accordance with my invention, the rolling elements 6 are held at a requisite distance from each other by a specially constructed composite cage which comprises a series of annularly disposed retainers 7 two of which are illustrated on a larger scale in FIG. 2 and each of which comprises a partition 8 and a pair of at least slightly elastic guides 11. Each retainer 7 consists of suitable wear-resistant synthetic plastic material and its partition 8 extends across the channel 34, i.e., in a radial plane of the antifriction bearing. FIG. 1 shows that the partitions 8 resemble comparatively short cylinders each of which has two end faces provided with substantially semispherical cavities 9 and a centrally located through hole 10 providing a passage between the respective cavities. The outer diameter of each partition 8 is preferably slightly less than the diameter of a rolling element 6 so that the partitions 8 may actually float in the channel 34 without necessarily touching the surfaces 3 and 4 unless the retainers 7 are deformed by the rolling elements. The clearance between the peripheries of the partitions 8 and the surfaces 3, 4 is preferably small. The cavities 9 are provided in the opposite sides or end faces of the partitions 8, and each thereof may receive a portion of the adjoining rolling element 6. The radii of curvature of the cavities 9 are slightly greater than the radii of the rolling elements 6 to make sure that there is normally less than full surface-to-surface contact between a partition and the adjoining rolling elements. As a matter of fact, the rolling elements may be in mere point contact with the adjacent partitions. However, for all practical purposes, the configuration of the cavities can be said to be complementary to the configuration of the rolling elements and the axial length of the holes 10 may be exceptionally small so that the rolling elements may be placed in very close proximity to each other. The holes 10 serve as reservoirs for oil or another suitable lubricant which is taken up by the surfaces of the rolling elements 6 when the bearing is in actual use and when the rolling elements move with reference to the races.

When the retainers 7 consist of a synthetic plastic material which is poured or extruded into a mold, the admission of plastic material into the mold may take place along the surfaces which surround the holes 10 because such surfaces cannot come in contact with the races and/or with the rolling elements. In other words, the surfaces surrounding the holes 10 require no precision finish. The remaining surfaces which do come in contact with the races and/or with the rolling elements need no aftertreatment if the surfaces surrounding the mold cavity are reasonably smooth. Any flashings along the surfaces surrounding the holes 10 will have no effect on the utility of the cage.

The guides 11 extend in the longitudinal direction of the respective recesses 21 and are shown in actual abutment with each other. Thus, each of these guides forms with the corresponding guides of the other retainers 7 a circumferentially complete annulus which is received in the respective recess 21 and which prevents tilting of the partitions 8. The guides 11 are received in their recesses 21 with comparatively small clearance to avoid any undesirable displacements of the retainers. It will be noted that the guides 11 prevent all but angular displacements of the partitions 8, i.e., these partitons are free to travel in the longitudinal direction of the channel 34 but will be unable to change their radial positions with reference to the bearing. The rolling elements 6 contact the surfaces 3 and 4 in the spaces between the adjacent partitions, see particularly FIG. 1. The guides 11 of each retainer 7 are located at the same distance from the axis of the bearing and are provided diametrically opposite each other, as seen in the circumferential direction of the respective partition.

The internal surfaces 12 of the guides 11 are of concave shape and their radii of curvature approximate the radii of the rolling elements 6 so that portions of each of these rolling elements may be in rolling contact with two pairs of internal surfaces 12. Such configuration of the guides 11 also contributes to proper retention of partitions 8 in requisite position with reference to the rolling elements 6 and races 1, 2. However, it is to be noted here that the guides 11 need not come in actual abutment with each other even though such abutment is normally desirable, especially when the bearing is used in machines which are subjected to high stresses. For example, and should the bearing be stressed to such an extent that the area of contact between the rolling elements 6 and partitions 8 increases, the partitions transmit such stresses to the guides 11 which disribute the stresses uniformly or nearly uniformly to all of the retainers 7 so that the rolling elements remain free to rotate in the cage.

Of course, and if desired, the thickness of the partitions 8 may be several times the thickness shown in FIG. 2, particularly if the bearing comprises a small number of rolling elements which should be maintained at a considerable distance from each other. It is also conceivable to use in the same cage retainers with partitions of different thickness and with guides of different length.

The retainers may consist of metallic material, particularly steel, aluminum or another light metal and various types of nonferrous metals. If they consist of synthetic plastic material, the retainers may be made of a material which is preferably selected from the group consisting of polyamides, acetal resins and polycarbonates. Suitable plastics which may be used in the manufacture of retainers are those marketed under the names of nylon, Delrin, Lexan and Vulkollan. If the material of the cage is to be of the self-lubricating type, the retainers may be made of synthetic plastics impregnated with graphite, oil or molykote. Polyamides also exhibit satisfactory self-lubricating characteristics.

FIG. 3 illustrates a portion of a modified antifriction bearing with cylindrical rolling elements 40. These elements 40 are provided in a chamber defined by a first race 41 and a second race, not shown. The cage comprises a series of metallic or plastic retainers 42 each of which includes a substantially parallelepiped partition 43 and a pair of elongated strip-shaped guides 44. The partitions 43 are received in the gaps between the adjoining rolling elements 40 and each thereof is provided with a pair of cavities 45 provided in the opposite sides thereof and serving to receive portions of adjacent rolling elements. If desired, the median portion of each partition may be provided with one or more through holes 46 (only one shown) which serve to store a supply of lubricant. The guides 44 are disposed at the axial ends of the rolling elements 40 and form two circumferentially complete annuli to insure uniform distribution of stresses when the bearing is in actual use. The races of the bearing shown in FIG. 3 also define a pair of recesses or similar passages which accommodate the guides 44 to make sure that the partitions 43 are held against any uncontrolled movement with reference to the races.

It is to be noted that the guides 44 need not extend symmetrically beyond two sides of the respective partitions 43. Thus, and if desired, each retainer 42 may comprise a pair of guides 44 which extend beyond one of the cavities 45 so that the retainer will resemble a letter U rather than a letter H as in FIG. 3. Other shapes are possible, for example, shapes resembling the letter L when a retainer comprises a single guide.

FIG. 4 illustrates a portion of a cage which consists of a series of plastic retainers 50 wherein the partitions 51 and the guides 52 are reinforced by T-shaped metallic inserts 53. Of course, it is also possible to reverse the position of metallic and plastic parts, i.e., to use metallic retainers with plastic inserts, to use retainers consisting in part of softer and in part of hard plastic material, or to use metallic retainers wherein portions of softer metal alternate with portions of steel or another hard metallic material. In FIG. 4, the surfaces 54 of the metallic inserts 53 reduce the wear between the retainers and the races, not shown.

It is not always necessary to provide the retainers with symmetrically distributed guides or with guides which are of equal dimensions. For example, and as shown in FIG. 5, a retainer 60 may be provided with a comparatively large guide 61 and with a smaller guide 62 which is located diametrically opposite the guide 61. The guides are integral with a metallic or plastic partition 63. FIG. 6 illustrates a retainer 65 with a smaller guide 66, a larger guide 67 and a partition 68. The angular distance between the guides 66, 67 (as seen in the circumferential direction of the partition 68) is less than 180 degrees, i.e., these guides are not located diametrically opposite each other. If desired, each retainer may be provided with a single guide or with three or more guides.

FIG. 7 illustrates a portion of a cage which is utilized in an axial antifriction bearing to separate spherical or cylindrical rolling elements. Each retainer 70 comprises an outer guide 71, an inner guide 72 and a partition 73. The length of the inner guides 72, as seen in the circumferential direction of the cage, is less than the length of the outer guides 72. In other words, the maximum diameter of the annulus which is formed by the guides 72 is less than the maximum diameter of the annulus consisting of guides 71. It will of course be understood that the retainers 70 can be made either from a plastic material, as shown, or from a metallic material.

Referring finally to FIG. 8, there is shown a more complicated retainer which is uitlized in the cage of a multiple-row antifriction bearing. This retainer 80 comprises two outer guides 81, 82, a median guide 83, a first partition 84 which is located between the guides 81, 83 and a second partition 85 located between the guides 82, 83 and coplanar with the partition 84. The partitions 84, 85 are provided with cavities 86, 87 and with centrally located through holes 88. It will be noted that the median guide 83 is shorter than the outer guides 81, 82. The retainer 80 may be assembled with a series of similar retainers to form a composite cage for two rows of spherical rolling elements.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A composite cage for rolling elements of antifriction bearings, comprising a plurality of annularly disposed distinct retainers unsecured to each other so as to be independently adjustable with reference to such rolling elements, said retainers each including a partition arranged to extend between a pair of adjoining rolling elements and having cavities provided in the opposite sides thereof so that portions of adjoining rolling elements may extend into such cavities, and at least one guide integral with the respective partition, said guides together forming at least one circumferentially complete annulus which is concentric with the cage.

2. A composite cage for rolling elements of antifriction bearings, comprising a plurality of annularly disposed distinct retainers being unsecured to each other and each including a partition arranged to extend between a pair of adjoining rolling elements and having cavities provided in the opposite sides thereof so that portions of adjoining rolling elements may extend into such cavities, each of said partitions having a pair of angularly spaced portions and at least one stress-transmitting reinforcing guide rigid with at least one portion of the respective partition, said guides together forming at least one circumferentially complete annulus which is concentric with the cage and being adapted for maintaining said partitions at a predetermined distance from each other, thus preventing compression of said partitions against rolling elements located between the same.

3. A composite cage for rolling elements of antifriction bearings, comprising a plurality of annularly disposed distinct retainers being unsecured to each other and, each of said retainers consisting of synthetic plastic material and each including a partition arranged to extend between a pair of adjoining rolling elements and having cavities provided in the opposite sides thereof so that portions of adjoining rolling elements may extend into such cavities, each of said partitions having a pair of angularly spaced portions and at least one stress-transmitting reinforcing guide rigid with at least one portion of respective partition, said guides together forming at least one circumferentially complete annulus which is concentric with the cage and being adapted for maintaining said partitions at a predetermined distance from each other, thus preventing compression of said partitions against rolling elements located between the same.

4. A composite cage for rolling elements of antifriction bearings, comprising a plurality of annularly disposed metallic distinct retainers being unsecured to each other and each including a partition arranged to extend between a pair of adjoining rolling elements and having cavities provided in the opposite sides thereof so that portions of adjoining rolling elements may extend into such cavities, each of said partitions having a pair of angularly spaced portions and at least one stress-transmitting reinforcing guide rigid with at least one portion of the respective partition, said guides together forming at least one circumferentially complete annulus which is concentric with the cage and being adapted for maintaining said partitions at a predetermined distance from each other, thus preventing compression of said partitions against rolling elements located between the same.

5. A composite cage for rolling elements of antifriction bearings, comprising a plurality of annularly disposed distinct retainers being unsecured to each other and each including a partition arranged to extend between a pair of adjoining rolling elements and having cavities provided in the opposite sides thereof so that portions of adjoining rolling elements may extend into such cavities, each of said partitions having a pair of angularly spaced portions and at least one stress-transmitting reinforcing guide rigid with at least one portion of the respective partition, said guides together forming at least one annulus which is concentric with the cage and being adapted for maintaining said partitions at a predetermined distance from each other, thus preventing compression of said partitions against rolling elements located between the same at least such portions of each retainer which are adapted to come in actual contact with rolling elements consisting of self-lubricating material.

6. A composite cage for rolling elements of antifriction bearings, comprising a plurality of annularly disposed distinct retainers being unsecured to each other and each including a partition arranged to extend between a pair of adjoining rolling elements and having cavities provided in the opposite sides thereof so that portions of adjoining rolling elements may extend into such cavities, each of said partitions having a pair of angularly spaced portions and at least one stress-transmitting reinforcing guide rigid with at least one portion of said partition, said guides together forming at least one circumferentially complete annulus which is concentric with said cage and being adapted for maintaining said partitions at a predetermined distance from each other, thus preventing compression of said partitions against rolling elements located between the same each of said retainers consisting of comparatively soft synthetic plastic material with reinforcing metallic inserts in such plastic material.

7. A composite cage for rolling elements of antifriction bearings, comprising a plurality of annularly disposed distinct retainers being unsecured to each other and each including a partition arranged to extend between a pair of adjoining rolling elements and having a pair of cavities in the opposite sides thereof so that portions of adjoining rolling elements may extend into such cavities, each of said partitions having angularly spaced portions and a plurality of guides each integral with one of said portions of said partition, said guides together forming at least two circumferentially complete annuli each of which is concentric with said cage and each guide being in actual abutment with a pair of adjoining guides of the same annulus and being adapted for maintaining said partitions at a predetermined distance from each other, thus preventing compression of said partitions against rolling elements located between the same.

8. A composite cage for rolling elements of antifriction bearings, comprising a plurality of annularly disposed retainers each including a partition arranged to extend between a pair of adjoining rolling elements and having a pair of cavities in the opposite sides thereof so that portions of adjoining rolling elements may extend into such cavities, and a plurality of guides integral with said partition, said guides together forming at least two circumferentially complete annuli each of which is concentric with said cage and each guide being in actual abutment with a pair of adjoining guides of the same annulus, the dimensions of one guide in each retainer differentiating from the dimensions of another guide in the same retainer.

9. A composite cage as set forth in claim 7, wherein the maximum diameter of one annulus of guides exceeds the maximum diameter of the other annulus of guides.

10. A composite cage as set forth in claim 7, wherein each of said guides is of arcuate shape and wherein the length of one guide on any given retainer exceeds the length of another guide on the same retainer, as seen in the circumferential direction of the cage.

11. A composite cage for rolling elements of multiple-row antifriction bearings, comprising a plurality of annularly disposed distinct retainers being unsecured to each other and each including a plurality of partitions, each partition being arranged to extend between a pair of adjoining rolling elements in a different row of rolling elements and each having cavities provided in the opposite sides thereof so that portions of adjoining rolling elements may extend into such cavities, each of said partitions having a pair of angularly spaced portions and at least one stress-transmitting reinforcing guide integral with at least one portion of said partitions, said guides together forming at least one circumferentially complete annulus which is concentric with the cage, the guides of each annulus being in actual abutment with each other and being adapted for maintaining said partitions at a predetermined distance from each other, thus preventing compression of said partitions against rolling elements located between the same.

12. A composite cage for rolling elements of double-row antifriction bearings as set forth in claim 11, wherein each of said retainers comprises two coplanar partitions, a pair of outer guides each integral with one portion of one of said partitions, and a median guide integral with each of and located between said partitions.

13. A composite cage for rolling elements of antifriction bearings, comprising a plurality of annularly disposed distinct retainers being unsecured to each other and each including a partition arranged to extend between a pair of adjoining rolling elements and having cavities provided in the opposite sides thereof so that portions of adjoining rolling elements may extend into such cavities, each of said partitions having a pair of angularly spaced portions and at least one stress-transmitting reinforcing guides each integral with one of said portions of said partition, said guides together forming a pair of circumferentially complete annuli of abutting guides, each of said annuli being concentric with said cage, the guides of each retainer being disposed diametrically opposite each other with the respective partition between and being adapted for maintaining said partitions at a predetermined distance from each other, thus preventing compression of said partitions against rolling elements located between the same.

14. A composite cage for rolling elements of antifriction bearings, comprising a plurality of annularly disposed retainers each including a cylindrical partition arranged to extend between a pair of adjoining rolling elements and having a pair of end faces provided with cavities so that portions of adjoining rolling elements may extend into such cavities, and a pair of guides integral with and extending beyond the peripheral surfaces of said partition, said guides forming a pair of circumferentially complete annuli of abutting guides and the angular distance between the guides of each retainer being less than 180 degrees as seen in the circumferential direction of the respective partition.

15. A composite cage for rolling elements of antifriction bearings, comprising a plurality of annularly disposed distinct retainers being unsecured to each other and each including a partition arranged to extend between a pair of adjoining rolling elements and having cavities provided in the opposite sides thereof so that portions of adjoining rolling elements may extend into such cavities, each of said partitions having a pair of angularly spaced portions and at least one stress-transmitting reinforcing guide rigid with at least one portion of the respective partition, said guides together forming at least one annulus which is concentric with the cage and being adapted for maintaining said partitions at a predetermined distance from each other, thus preventing compression of said partitions against rolling elements located between the same each of said partitions having at least one hole extending between the respective cavities.

16. An antifriction bearing, comprising a plurality of annular races defining between themselves a concentric annular channel and an annular recess concentric with and in communication with said channel; a plurality of rolling elements provided in said channel; and a composite cage for said rolling elements, said cage comprising a plurality of annularly disposed distinct retainers being unsecured to each other and each including a partition extending across said channel intermediate a pair of adjoining rolling elements, each of said partitions having a pair of angularly spaced portions and at least one stress-transmitting reinforcing guide rigid with one of said portions of said partition and extending into said recess, the guides of the respective retainers together forming a circumferentially complete annulus and being adapted for maintaining said partitions at a predetermined distance from each other, thus preventing compression of said partitions against rolling elements located between the same.

17. An antifriction bearing, comprising a plurality of annular races defining between themselves a concentric annular channel and an annular recess concentric with and in communication with said channel; a plurality of rolling elements provided in said channel; and a composite cage for said rolling elements, said cage comprising a plurality of annularly disposed distinct retainers being unsecured to each other and each including a partition extending across said channel intermediate a pair of adjoining rolling elements, each of said partitions having a pair of angularly spaced portions and at least one stress-transmitting reinforcing guide integral with one of said portions of the respective partition and received in said recess, said guides together forming a circumferentially complete annulus in said recess and preventing all other but longitudinal movements of said partitions in said channel and being adapted for maintaining said partitions at a predetermined distance from each other, thus preventing compression of said partitions against rolling elements located between the same.

18. An antifriction bearing, comprising a plurality of annular races defining between themselves a concentric annular channel and an annular recess concentric and in communication with said channel; a plurality of rollig elements provided in said channel; and a composite cage for said rolling elements, said cage comprising a plurality of annularly disposed distinct retainers being unsecured to each other and each including a partition extending across said channel intermediate a pair of adjoining rolling elements, each of said partitions having a pair of angularly spaced portions and at least one stress-transmitting reinforcing guide integral with one of said portions of the respective partition and received in said recess, the guides of adjoining retainers being in abutment with each other so as to form a circumferentially complete annulus in said recess and being adapted for maintaining said partitions at a predetermined distance from each other, thus preventing compression of said partitions against rolling elements located between the same and each of said partitions being provided with a pair of cavities arranged to receive portions of adjoining rolling elements.

19. A composite cage for rolling elements of antifriction bearings, comprising a plurality of annularly disposed retainers each including a partition arranged to extend between a pair of adjoining rolling elements and having cavities provided in the opposite sides thereof so that portions of adjoining rolling elements may extend into such cavities, each of said retainers also including a stress transmitting guide and all said guides together forming at least one circumferentially complete annulus which is concentric with said cage, at least some of said retainers consisting in part of softer and in part of harder material.

References Cited by the Examiner

UNITED STATES PATENTS

| | | | |
|---|---|---|---|
| 2,946,633 | 7/1960 | Gothberg | 308—217 |
| 2,969,267 | 1/1961 | Gothberg | 308—217 |
| 3,075,278 | 1/1963 | Bratt | 29—149.4 |

FOREIGN PATENTS

| | | |
|---|---|---|
| 1,231,348 | 4/1960 | France. |
| 590,163 | 7/1947 | Great Britain. |

MARTIN P. SCHWADRON, *Primary Examiner.*
FRANK SUSKO, *Examiner.*